(12) United States Patent
Kumar

(10) Patent No.: US 9,008,580 B2
(45) Date of Patent: Apr. 14, 2015

(54) CONFIGURING A CODEC FOR COMMUNICATING AUDIO DATA USING A BLUETOOTH NETWORK CONNECTION

(75) Inventor: Aarti Kumar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 310 days.

(21) Appl. No.: 13/597,140

(22) Filed: Aug. 28, 2012

(65) Prior Publication Data

US 2013/0331032 A1 Dec. 12, 2013

Related U.S. Application Data

(60) Provisional application No. 61/657,848, filed on Jun. 10, 2012.

(51) Int. Cl.
*H04B 7/00* (2006.01)
*H04M 1/725* (2006.01)
*H04M 1/60* (2006.01)

(52) U.S. Cl.
CPC .......... *H04M 1/7253* (2013.01); *H04M 1/6066* (2013.01); *H04M 2250/02* (2013.01)

(58) Field of Classification Search
CPC .............. H04N 7/152; H04N 21/2393; H04N 21/2407; H04N 21/25808; H04N 21/2662; H04N 21/44016; H04M 7/0072; H04M 7/1225; H04M 1/72561; H04M 2250/12; H04W 36/14; H04W 28/18; H04W 56/00; H04W 76/02; H04W 80/00
USPC ............ 348/14.09, 333.1; 370/229, 236, 254, 370/356, 389; 379/202.01, 158, 399, 2, 379/9.06; 455/41.1–41.3; 709/224, 226; 725/32, 46, 92, 93, 97
See application file for complete search history.

(56) References Cited

U.S. PATENT DOCUMENTS

2008/0300025 A1* 12/2008 Song et al. ................. 455/569.1
2010/0020729 A1    1/2010 Walley et al.
(Continued)

FOREIGN PATENT DOCUMENTS

JP          2011176620 A      9/2011

OTHER PUBLICATIONS

Bluetooth Doc: "Hands-Free Profile 1.6" May 10, 2011.
(Continued)

*Primary Examiner* — Golam Sorowar
(74) *Attorney, Agent, or Firm* — Park, Vaughan, Fleming & Dowler LLP; Anthony P. Jones

(57) ABSTRACT

In the described embodiments, when configuring a Bluetooth network connection between a first electronic device and a second electronic device, the first electronic device sends a configuration message to the second electronic device that indicates that a first codec is preferentially to be used when communicating audio data using the Bluetooth network connection. Upon receiving a response from the second electronic device that indicates that the first codec is permissible to use, the first electronic device configures itself to use the first codec when communicating audio data using the Bluetooth network connection. Otherwise, upon receiving a response from the second electronic device that indicates that the first codec is not permissible to use, the first electronic device configures itself to use a second codec when communicating audio data using the Bluetooth network connection.

25 Claims, 4 Drawing Sheets

(56) References Cited

U.S. PATENT DOCUMENTS

2010/0273417 A1* 10/2010 Tian et al. .................... 455/41.2
2010/0304674 A1* 12/2010 Kim et al. .................... 455/41.2

OTHER PUBLICATIONS

Bluetooth Audio Video Working Group: "Advanced Audio Distribution Profile Specification—Adopted version 1.0" May 22, 2003.

* cited by examiner

CONFIGURING A CODEC FOR COMMUNICATING AUDIO DATA USING A BLUETOOTH NETWORK CONNECTION

RELATED CASES

The instant application is a non-provisional application from, and hereby claims priority under 35 U.S.C. §120 to, U.S. provisional application No. 61/657,848, which is titled "Configuring a Codec for Communicating Audio Data using a Bluetooth Network Connection," by inventor Aarti Kumar, which was filed on 10 Jun. 2012, and which is hereby incorporated by reference.

BACKGROUND

1. Field

The described embodiments relate to electronic devices. More specifically, the described embodiments relate to configuring a codec for communicating audio data using a Bluetooth network connection in electronic devices.

2. Related Art

Many modern electronic devices provide applications and services that can be used for transmitting and receiving audio data (e.g., speech). For example, these devices can provide cellular phone services, voice messaging services, video chat, voice-scanning/interpreting applications, and other such applications. For example, a transmitting electronic device can receive speech audio as spoken input from a user (e.g., using a microphone), process the speech audio to generate digitally encoded audio data, and transmit the digitally encoded audio data to a receiving device. A receiving device then receives the digitally encoded audio data, processes the digitally encoded audio data to generate the speech audio, and outputs the speech audio to a user of the receiving device.

These electronic devices commonly use networking subsystems within the electronic devices for transmitting and receiving speech audio data. For example, these electronic devices can use networking subsystem with a cellular network interface (UMTS, LTE, etc.), a Bluetooth interface, and/or a wireless network interface (e.g., a wireless network such as described in the Institute of Electrical and Electronics Engineers (IEEE) standards 802.11). Many existing electronic devices that use Bluetooth (e.g., with Bluetooth headsets, speakers, etc.) for communicating audio data can unnecessarily limit the sampling rate of the audio data at, e.g., 8 kHz instead of 16 kHz, and can therefore limit the quality of the audio data that can be reproduced by a given device. For example, although some applications (e.g., video chat applications, voice recognition applications, etc.) can provide higher sampling rates (e.g., 16 kHz, 22 kHz, etc.), when using a Bluetooth connection to communicate encoded audio data, the electronic devices may limit the application's audio sampling rate or may otherwise reduce sampling rate/audio quality when processing speech audio in preparation for transmitting the audio data using the Bluetooth interface. Using a lower sampling rate for the Bluetooth interface can result in a suboptimal user experience.

SUMMARY

The described embodiments include an electronic device that configures a codec. In the described embodiments, a first electronic device receives an indication that a Bluetooth network connection is to be formed between the first electronic device and another available electronic device, wherein the indication includes a request to preferentially use a first codec for communicating audio data using the Bluetooth network connection. Upon discovering a second electronic device while performing operations to discover another available electronic device for forming the Bluetooth network connection, the first electronic device performs operations to configure the Bluetooth network connection, wherein performing the operations comprises sending a configuration message to the second electronic device that indicates that the first codec is preferentially to be used when communicating audio data using the Bluetooth network connection. Upon receiving a response from the second electronic device that indicates that the first codec is permissible to use when communicating audio data using the Bluetooth network connection, the first electronic device configures itself to use the first codec when communicating audio data using the Bluetooth network connection. On the other hand, upon receiving a response from the second electronic device that indicates that the first codec is not permissible to use when communicating audio data using the Bluetooth network connection, the first electronic device configures itself to use a second codec when communicating audio data using the Bluetooth network connection.

In some embodiments, the first codec is a M kHz codec and the second codec is an N kHz codec, where M and N represent numbers and M>N.

In some embodiments, when subsequently using the Bluetooth network connection to communicate audio data from the first electronic device to the second electronic device, the first electronic device configures one or more circuits in the first electronic device to perform an audio processing operation at a predetermined rate so that sufficient audio data is available for filling payloads of data packets to be communicated to the second electronic device using the Bluetooth network connection without overflowing the payloads of the data packets, wherein the predetermined rate is chosen in accordance with the codec being used.

In some embodiments, after the Bluetooth network connection has been formed between the first electronic device to the second electronic device, the first electronic device determines that the first electronic device is preferentially to be switched from using a present codec to using another codec. The first electronic device then sends a configuration message to the second electronic device that indicates that the other codec is preferentially to be used. Upon subsequently receiving a response from the second electronic device that indicates that using the other codec is permissible, the first electronic device configures itself to use the other codec when using the Bluetooth network connection to communicate audio data from the first electronic device to the second electronic device. Upon receiving a response from the second electronic device that indicates that using the other codec is not permissible, the first electronic device continues to use the present codec when using the Bluetooth network connection to communicate audio data from the first electronic device to the second electronic device.

In some embodiments, when sending the configuration message to the second electronic device, the first electronic device lists each codec supported by the first electronic device in a first order of preference in the configuration message. In these embodiments, receiving the response from the second electronic device comprises receiving a response from the second electronic device that comprises a listing of each codec supported by the second electronic device in a second order of preference, wherein the second order of preference is based on the first order of preference. The first electronic device then determines a codec that is permissible to use based on the second order of preference in the response from the second electronic device.

In some embodiments, sending the configuration message comprises including an indication in the configuration message that the second codec is to be used in the event that it is not permissible to use the first codec.

BRIEF DESCRIPTION OF THE FIGURES

In the figures, like reference numerals refer to the same figure elements.

DETAILED DESCRIPTION

Figure 1:
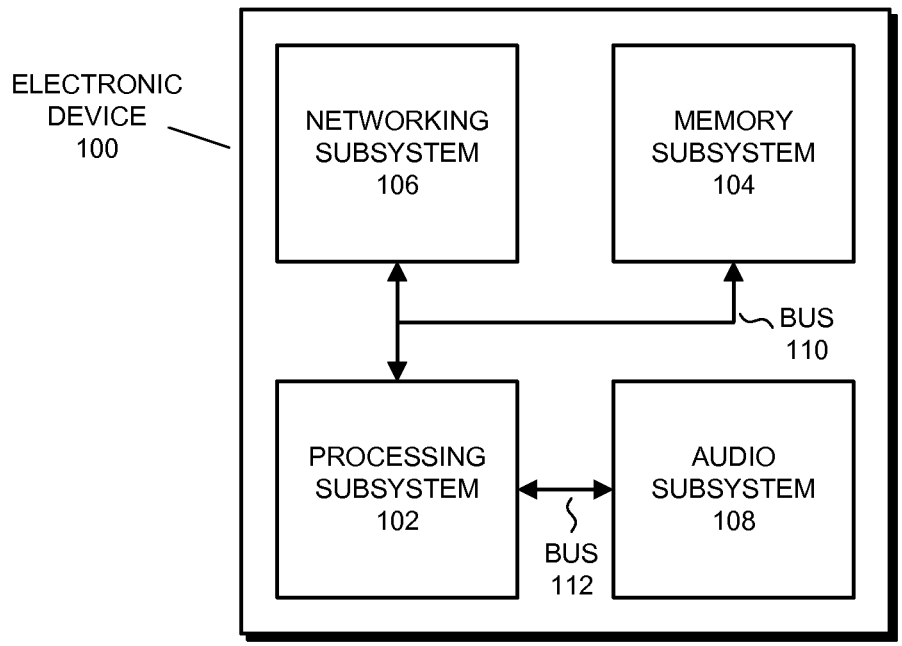
FIG. 1 presents a block diagram of an electronic device in accordance with the described embodiments.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transitory signals.

The methods and processes described in this detailed description can be included in hardware modules. For example, the hardware modules can include, but are not limited to, processing subsystems, microprocessors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When an electronic device with computing capabilities reads and executes the code and/or data stored on the computer-readable storage medium, the electronic device performs the methods and processes embodied as data structures and code and stored within the computer-readable storage medium. For example, in some embodiments, a processing subsystem can read the code and/or data from a memory subsystem that comprises a computer-readable storage medium, and can execute code and/or use the data to perform the methods and processes.

In the following description, we refer to "some embodiments." Note that "some embodiments" describes a subset of all of the possible embodiments, but does not always specify the same subset of the embodiments.

Overview

The described embodiments use the Bluetooth standard to communicate audio data between electronic devices. The existing Bluetooth standard is described in the Core v. 4.0 Specification for the Bluetooth System from the Bluetooth Special Interest Group (SIG) of Kirkland, Wash., which was published on 30 Jun. 2010. The Core v. 4.0 Specification for the Bluetooth System is hereby incorporated by reference to describe the aspects of the Bluetooth standard that are not herein described.

In the described embodiments, as a Bluetooth connection is established between two electronic devices, the devices can communicate with each other to determine if wide band speech (WBS) is supported by the other device. Generally, when a device supports WBS, the device can process audio using a 16 kHz codec such as a modified subband codec or "mSBC" codec (typically in addition to providing an 8 kHz codec such as the continuously variable slope delta modulation or "CVSD" codec), and when the device does not support WBS, the device processes audio using the 8 kHz codec. In these embodiments, when the electronic devices both support WBS, the devices can configure themselves to use WBS when subsequently communicating audio data using the Bluetooth connection.

As an example of the configuration operation, assume a Bluetooth connection is being established between a Bluetooth-enabled smart phone and a Bluetooth headset (e.g., the smart phone is being "paired" with the headset). Assume further that the smart phone is configured to preferentially use a 16 kHz codec because, e.g., an application that is to use the Bluetooth network connection has requested the use of the 16 kHz codec, but that the smart phone will default to using an 8 kHz codec in the event that a paired device does not support WBS and therefore does not use the 16 kHz codec. While performing a set of operations for establishing the Bluetooth connection, the smart phone can send a control PDU (protocol data unit or "packet") to the headset that indicates that the 16 kHz codec is the desired codec. If the 16 kHz codec is supported by the headset (and the headset is otherwise configured to use the 16 kHz codec), the headset can send a responding control PDU to the smart phone with an indication that it is permissible to use the 16 kHz codec. The smart phone and headset can then configure themselves to use the 16 kHz codec for processing audio data during subsequent communication on the Bluetooth network connection. Otherwise, when the 16 kHz codec is not supported by the headset or the headset is configured not to use the 16 kHz codec for another reason, e.g., battery levels, etc., the headset can send a PDU to the smart phone with an indication that the 16 kHz codec cannot be used. The devices can then configure themselves to use the default 8 kHz codec.

In some embodiments, multiple codecs may be available for use on one or both of the electronic devices establishing a Bluetooth connection. In these embodiments, the control PDUs exchanged between the devices can indicate two or more codecs (perhaps in preference order) that may be used for processing audio data for transmission on the Bluetooth network connection. In some of these embodiments, a responding control PDU sent from one of the devices can include an indication that one or more of the indicated codecs is permissible to use (including perhaps listing the codecs in preference order), and may indicate that a particular one of the codecs will be configured to be used, unless further communication is received.

In some embodiments, a given device can determine a codec that is being used to generate audio data for incorporation into data PDUs for transmission on a Bluetooth network connection, and can determine a maximum data rate on the Bluetooth network connection. From these values, the device can compute a maximum number of audio samples that can be taken in a given time interval to be incorporated in a PDU that is to be transmitted on the Bluetooth network connection. The device can then configure an audio sampling mechanism (perhaps along with other circuits or applications in the electronic device) to take the computed maximum number of audio samples.

In some embodiments, electronic devices on a Bluetooth network connection can send control PDUs at any time to configure and/or reconfigure the codec being used on a Bluetooth network connection. In this way, for example, if an application that preferentially uses the 16 kHz codec starts after the Bluetooth network connection is established, the above described configuration operations can be performed (or re-performed) to configure the codec that is used by the devices.

The described embodiments can improve the performance of electronic devices using a Bluetooth network connection by enabling the devices to choose a codec that provides an appropriate level of audio processing. This can improve the user experience and/or enable higher-fidelity audio to be used in applications such as voice-recognition, etc.

Electronic Device

FIG. 1 presents a block diagram of an electronic device 100 in accordance with the described embodiments. Electronic device 100 includes processing subsystem 102, memory subsystem 104, networking subsystem 106, and audio subsystem 108.

Processing subsystem 102 can include one or more devices configured to perform computational operations. For example, processing subsystem 102 can include, but is not limited to, one or more processors, ASICs, microcontrollers, digital signal processors, or programmable-logic devices.

Memory subsystem 104 can include one or more devices for storing data and/or instructions for processing subsystem 102 and networking subsystem 106. For example, memory subsystem 104 can include DRAM, flash memory, and/or other types of memory. In addition, memory subsystem 104 can include mechanisms for controlling access to the memory. In some embodiments, memory subsystem 104 includes a memory hierarchy that includes an arrangement of one or more caches coupled to a memory for electronic device 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by electronic device 100 as fast-access storage for often-used data, while the mass-storage device is used to store less frequently used data.

Networking subsystem 106 can include one or more devices configured to couple to and communicate on a wired and/or wireless network (i.e., to perform network operations). For example, networking subsystem 106 can include, but is not limited to, a Bluetooth networking system, a cellular networking system (e.g., a 3G/4G network), a networking system based on the standards described in Institute for Electrical and Electronic Engineers (IEEE) 802.11 (i.e., an 802.11 wireless network), or a wireless personal-area networking (PAN) system (e.g., an infrared data association (IrDA), ultra-wideband (UWB), Z-Wave, or a network based on the standards described in IEEE 802.15).

Networking subsystem 106 can include controllers, radios/antennas for wireless network connections, sockets/plugs for hard-wired electrical connections, and/or other devices used for coupling to, communicating on, and handling data and events on a wired and/or wireless network. In some of these embodiments, networking subsystem 106 can include one or more mechanisms for forming an ad hoc network connection with other devices. In the following description, we refer to a subset of the mechanisms used for coupling to, communicating on, and handling data and events on the network at the physical layer of each network connection collectively as the "interface" for the corresponding network connection.

Audio subsystem 108 can include one or more transducers configured to generate and/or output signals that a user of electronic device 100 can perceive as sound. For example, audio subsystem 108 can include speakers, amplifiers, drivers, vibrating mechanisms, and/or other mechanisms. In addition, audio subsystem 108 can include one or more transducers configured to convert received audio such as speech audio into electrical signals that can be used for generating digitally-encoded audio data. For example, audio subsystem 108 can include one or more microphones and/or other mechanisms. Moreover, audio subsystem 108 can include one or more encoder/decoder circuits, processing circuits, transcoder circuits, converter circuits, and/or other devices for processing audio data. For example, in some embodiments, a processing device in audio subsystem 108 can be configured to process audio data at a given sampling rate based on the application(s) that are being used to process the audio data in the device and/or in another device.

Within electronic device 100, processing subsystem 102, memory subsystem 104, and networking subsystem 106 are coupled together using bus 110, and processing subsystem 102 and audio subsystem 108 are coupled together using bus 112. Bus 110 is an electrical connection that processing subsystem 102, memory subsystem 104, and networking subsystem 106 can use to communicate commands and data to each other, and bus 112 is an electrical connection that processing subsystem 102 and audio subsystem 108 can use to communicate commands and data to each other. Although busses 110 and 112 are shown for clarity, different embodiments can include a different number and/or configuration of electrical connections. Generally, electronic device 100 comprises sufficient electrical connections to enable processing subsystem 102, memory subsystem 104, networking subsystem 106, and audio subsystem 108 to communicate with one another.

Electronic device 100 can be, or can be incorporated into, many different types of electronic devices. For example, electronic device 100 can be part of a desktop computer, a laptop computer, a server, a media player, an appliance, a subnotebook/netbook, a tablet computer, a smart-phone, a piece of testing equipment, a network appliance, a set-top box, a personal digital assistant (PDA), a smart phone, a toy, a controller, or another device. Additionally, electronic device 100 can be, or can be part of, a headset, a hearing aid, a speaker, a headphone (or a pair of headphones), and/or another device that renders sound to be perceived by a user.

Although we use specific components to describe electronic device 100, in alternative embodiments, different components and/or subsystems may be present in electronic device 100. For example, electronic device 100 may include one or more additional processing subsystems 102, memory subsystems 104, and/or networking subsystems 106. Alternatively, one or more of the subsystems may not be present in electronic device 100. Moreover, although separate subsystems are shown in FIG. 1, in some embodiments, some or all of a given subsystem can be integrated into one or more of the other subsystems in electronic device 100. In addition, in some embodiments, electronic device 100 includes one or more additional subsystems that are not shown in FIG. 1. For example, electronic device 100 can include, but is not limited to, a data collection subsystem, a display subsystem, and/or an input/output (I/O) subsystem. In some embodiments, electronic device 100 includes one or more batteries (not shown) that provide power for electronic device 100.

As described above, in some embodiments, electronic device 100 can be (or can be incorporated in) a device such as a headset. In these embodiments, some or all of processing subsystem 102, memory subsystem 104, networking subsystem 106, and audio subsystem 108 can be configured as low-power mechanisms. For example, processing subsystem 102 can be a low-power processing mechanism and/or a processing mechanism with limited functionality. Moreover, in some embodiments, processing subsystem 102, memory subsystem 104, networking subsystem 106, and audio subsystem 108 can be custom-built to perform the indicated functions (processing, storing instructions and/or data, etc.) in electronic device 100, e.g., can be custom ASICs.

System

Figure 2:
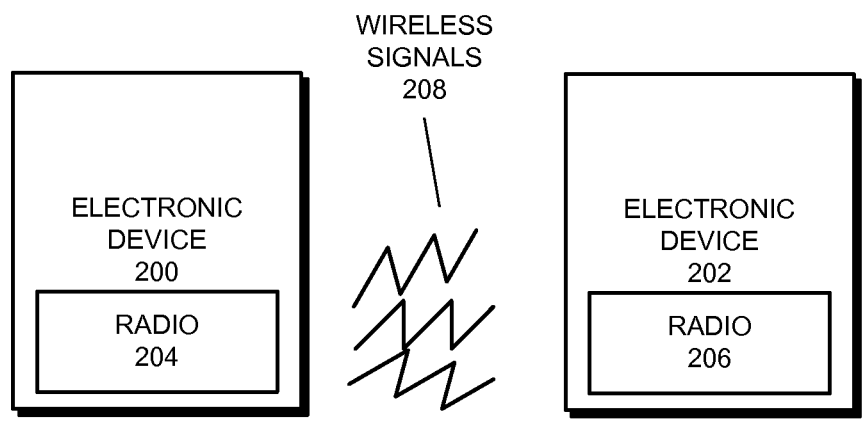
FIG. 2 presents a block diagram illustrating a system in accordance with the described embodiments.

FIG. 2 presents a block diagram illustrating a system in accordance with the described embodiments. The system shown in FIG. 2 includes electronic devices 200 and 202, which can be any devices that can communicate using a Bluetooth network connection between the devices. For example, in some embodiments, electronic device 200 can be a smart phone, a laptop computer, a tablet computer, a media player, a kiosk, a toy, etc., and electronic device 202 can be a headset, a speaker, headphones, a smart phone, a laptop, a tablet computer, etc. Electronic devices 200 and 202 include radios 204 and 206. Radios 206 and 208 are used by the electronic devices for communicating using the Bluetooth network connection. In addition, although the subsystems are not shown in FIG. 2 for clarity, electronic devices 202 and 204 can include subsystems such as those shown in electronic device 100 in FIG. 1 (i.e., processing subsystem 102, etc.). For example, radios 204 and 206 can be incorporated in a corresponding network interface in a networking subsystem 106 in each of electronic devices 200 and 202.

Wireless signals 208 in FIG. 2 are transmitted from radio 204 in electronic device 200 as part of the process of communicating using a Bluetooth network connection. Specifically, using techniques described in the Core v. 4.0 Specification for the Bluetooth System, electronic device 200 can communicate Bluetooth packets (PDUs, etc.) to electronic device 202 using wireless signals 208. Wireless signals 208 are received by the radio 206 in electronic device 200 and processed by the networking subsystem 106 and/or the processing subsystem 102 in electronic device 200. Although not shown in FIG. 2, wireless signals can also be transmitted from radio 206 in electronic device 202 and received by radio 204 and processed in electronic device 200 in a similar way.

In the described embodiments, electronic devices 200 and 202 comprise hardware devices (e.g., mechanisms, circuits, processors, etc.) and/or applications that are used for performing the operations of one or more codecs that generate digitized data from analog audio input signals (which can be called "encoding") and/or generate an analog audio output signal from digital data (which can be called "decoding"). For encoding, each of the electronic devices can comprise a transducer such as a microphone that converts audio into an analog signal, a sampler that samples at a given frequency (e.g., 8 kHz, 16 kHz, 22 kHz, etc.), a processing circuit and/or an application that is executed by a processing mechanism (i.e., codec) that converts the samples into digitized audio data. For decoding, each of the electronic devices can comprise a processing circuit and/or an application that is executed by a processing mechanism (i.e., codec) that converts the digitized audio data into an analog signal, and a transducer such as a speaker that converts the analog signal into an audible (or otherwise perceptible) output.

In some embodiments, electronic device 200 and/or electronic device 202 support both a both a 16 kHz codec (e.g., an mSBC codec) and an 8 kHz codec (e.g., a CVSD codec), so that a sampling rate of either 16 kHz or 8 kHz can be used for processing audio (e.g., speech) data, depending on the codec that the electronic device is configured to use. In some of these embodiments, the 8 kHz codec can be the default codec, with the 16 kHz codec preferentially used when a given application supports and/or requests the 16 kHz codec. Note that, although an 8 kHz and 16 kHz are herein described, other codecs may be used in some embodiments. Generally, the operations described herein can be performed for any devices that support one or both of an N kHz and M kHz codec, where N>M.

To enable the preferential use of the 16 kHz codec, processing subsystem 102 and/or networking subsystem 106 in electronic device 200 are configured communicate with electronic device 202 (e.g., using wireless signals 208) to negotiate the codec to be used when processing audio data. Specifically, when initially establishing a Bluetooth network connection between the devices electronic device 200 can send a PDU to electronic device 202 to communicate that the 16 kHz codec is preferentially to be used when processing audio data. If electronic device 202 includes a 16 kHz codec and the use of the 16 kHz is permissible for electronic device 202 (e.g., electronic device 202 has sufficient battery power, etc.), electronic device 202 can return a PDU acknowledging that the 16 kHz is to be used for processing audio data. Otherwise, electronic device 202 can return a PDU indicating that the 8 kHz codec (or some other codec, if supported) should be used for processing audio data. In some embodiments, either or both of electronic devices 200 and 202 can indicate a preferred order of codecs in the PDU, and the other of the electronic device can respond with a PDU that includes list or a single codec.

In some embodiments, the codec that is to be used for processing audio data can be reconfigured at any time while the electronic devices are communicating (i.e., can be dynamically reconfigured). For example, electronic device 202 can initially indicate that a first codec (e.g., an 8 kHz codec) is to be used, but later can initiate a reconfiguration by communicating a PDU to electronic device 200 that indicates that a second codec (e.g., a 16 kHz codec) can be used for processing audio data. If electronic device 200 is configured to use the second codec, electronic device 200 can respond with a PDU that indicates that the second codec is to be used. Otherwise, electronic device 200 can respond with a PDU with an indication that the codec is not to be changed from the first codec. In some embodiments, when the change is agreed upon (i.e., when the acknowledging response PDU is received by the initiating device), a next audio data processed and transmitted by either device will be processed using the second codec. Alternatively, a predetermined delay can be used or indicated in one or more of the reconfiguration PDUs, or one or more additional PDUs can be exchanged to configure the timing for the switch to the second codec.

Although communications for configuring codes are described as being initiated by one or the other of electronic devices 202 and 202, in the described embodiments, either of the devices can initiate the communications. Specifically, the initial set-up of codecs (i.e., transmission of a PDU indicating which codec(s) are to be used) and/or the dynamic reconfiguration can be performed by either electronic device 200 or electronic device 202.

Applications and Operating System

Figure 3:
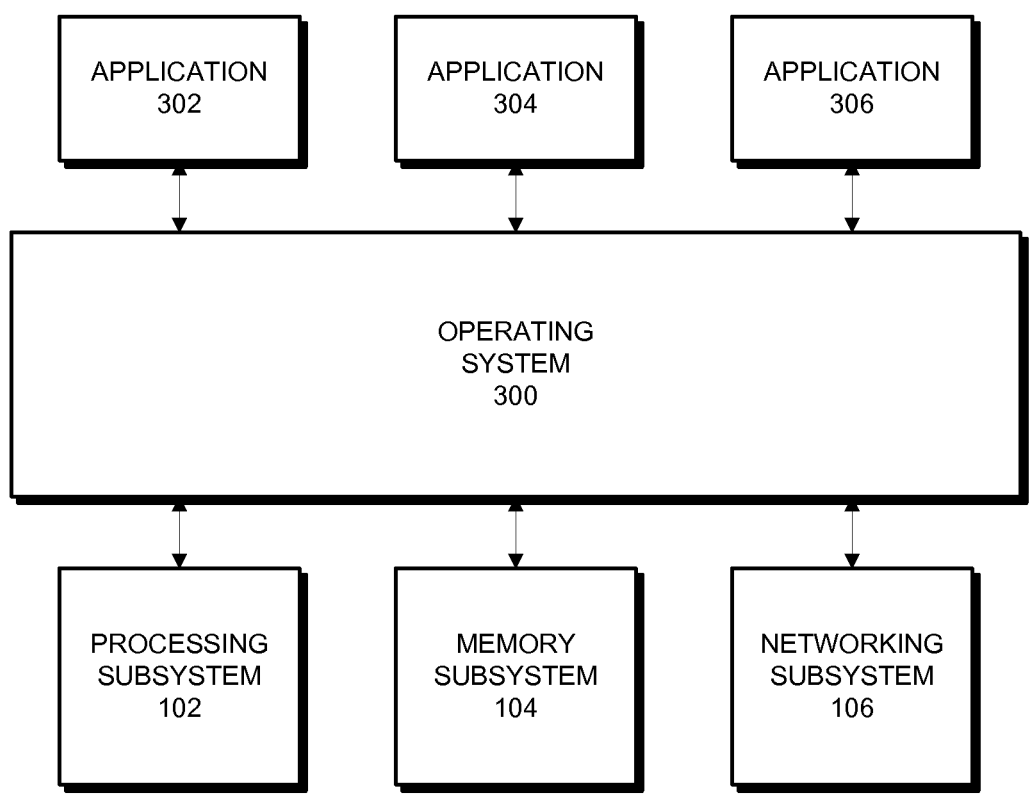
FIG. 3 presents a block diagram illustrating operating system and applications in accordance with the described embodiments.

FIG. 3 presents a block diagram illustrating an operating system 300 in accordance with the described embodiments. In some embodiments, operating system 300 is stored (as program code) in a memory subsystem 104 in an electronic device (e.g., electronic device 100, 200, and/or 202) and executed by processing subsystem 102 in the electronic device.

Generally, operating system 300 serves as an intermediary between system hardware in the electronic device (e.g., subsystems 102-106) and applications executed by processing subsystem 102, such as applications 302-306 (which can be, for example, a video chat application, a voice recognition application, and a game application). For example, operating system 300 can be, but is not limited to being, the OS X operating system from Apple Inc. of Cupertino, Calif.; the FreeBSD operating system from The FreeBSD Foundation of Boulder, Colo.; or another operating system. Operating systems and their general functions are known in the art and hence are not described in detail.

To manage the transfer of packets to and from applications in electronic device 100 using an appropriate interface in networking subsystem 106, operating system 300 maintains one or more network protocol stacks (not shown) that each includes a number of logical layers. For example, the operating system can maintain a Bluetooth stack, an Internet protocol stack, etc. The functions associated with each of the layers in the protocol stacks are known in the art and hence are not described in detail.

In some embodiments, operating system 300 and/or an application (e.g., a daemon) executing on the electronic device comprise mechanisms for receiving and processing a request to use a given codec for processing audio data. For example, operating system 300 and/or the daemon can receive and process a request for a given codec from one of applications 302-306. In these embodiments, operating system 300 and/or the daemon may: (1) receive a request for a given codec (e.g., a 16 kHz codec) from the application; (2) generate a PDU with the codec indicated; (2) communicate the PDU to the other electronic device using the Bluetooth network connection; (3) receive a responding PDU from the other electronic device that indicates whether a given codec is accepted or denied; (4) indicate the response (codec accepted or denied) to the requesting application; and/or (5) configure the electronic device to use the codec (or to use a different codec).

In some embodiments, operating system 300 and/or the daemon can be configured to recognize the type of interface that is being used to communicate audio data with another device, and can be configured to only request a higher-sampling-rate codec (e.g., a 16 kHz codec) when the interface is configured to operate at the correspondingly higher data rates. For example, because some network interfaces enable only the lower-data-rate 8 kHz codec, operating system 300 and/or the daemon can be configured to automatically deny requests for higher-data-rate codecs (e.g., the 16 kHz codec) when using these network interfaces. Alternatively, applications 302-306 can be configured to recognize which interface is being used to communicate the audio data that they process, and can be configured to request higher-data-rate codecs only for network interfaces where such codecs can be used. For example, a cellular connection or another type of connection may only permit the use of data generated using the 8 kHz codec, while a WiFi connection enables a higher sampling rate codec such as the 16 kHz codec.

In some embodiments, when applications 302-306 make the request for the higher-data-rate codecs, operating system 300 (e.g., the Bluetooth stack) and/or the daemon handle the communication and configuration of the Bluetooth network connection transparently to the applications. In other words, aside from making the request, the applications may not perform any other operations related to the configuration of the codec for the Bluetooth network connection.

Audio Processing

In some embodiments, the Bluetooth network connection between two electronic devices is configured as an extended synchronous connection oriented (eSCO) network connection on which PDUs are transmitted/received during predetermined time slots. On eSCO network connections, a given device transmits PDUs during a transmit time slot for the device, and receives PDUs during a receive time slot for the device. In addition, the devices can exchange data using packets of known formats with corresponding maximum sizes on the Bluetooth network connection (e.g., the 2ECV packet format, etc.).

Because the transmission schedule and the packet format can be known, and hence an amount of payload space available for audio data can be determined, a device can be configured to sample audio data (and perform other audio processing operations) in such a way to fill the available payload space. More specifically, an electronic device that is sampling audio (speech, environmental sounds, etc.) for eventual incorporation in a packet and delivery on the Bluetooth network connection can be configured to take a given number of samples to fill the available packets for transmission on the Bluetooth network connection.

In some embodiments, pulse code modulated (PCM) sampling is used for capturing audio data. In these embodiments, as described above, the number and timing of samples can be configured so that the known payload space of packets to be transmitted on the Bluetooth network connection can be filled.

Configuring a Codec in an Electronic Device

Figure 4:
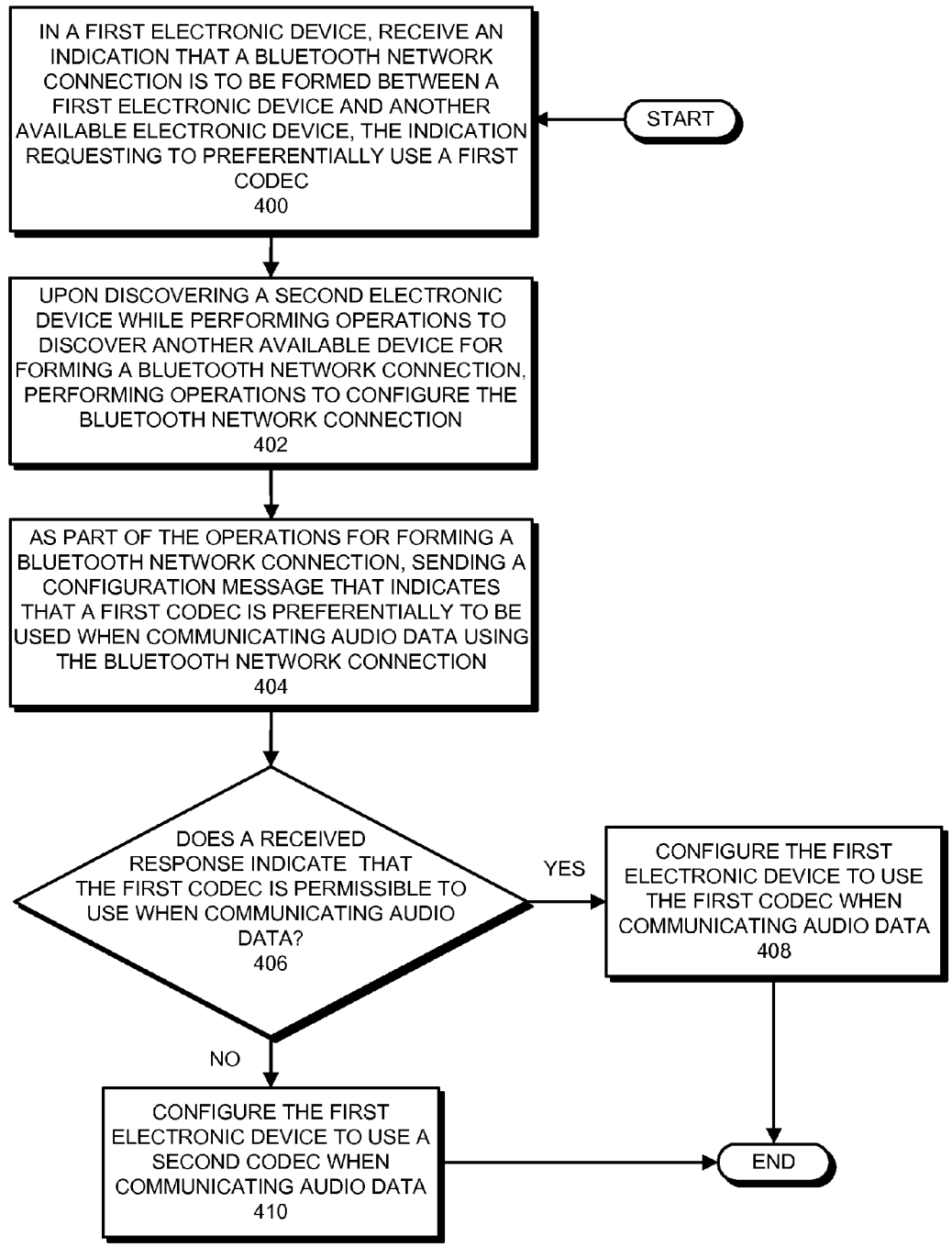
FIG. 4 presents a flowchart illustrating a process for configuring a codec in an electronic device in accordance with the described embodiments.

FIG. 4 presents a flowchart illustrating a process for configuring a codec in an electronic device in accordance with the described embodiments. The process starts when electronic device 200 (e.g., a smart phone or a laptop) receives an indication (e.g., from an application executing on electronic device 200 or from another subsystem in electronic device 200) that a Bluetooth connection is to be formed with another available electronic device, the indication including a request that a first codec be used for communicating audio data using the Bluetooth network connection (step 400). For example the first codec can be a 16 kHz codec and a second codec (described below) can be a 8 kHz codec. However, in alternative embodiments, other combinations of codecs may be used. Generally, the operations described herein can be performed for any group of electronic devices that support one or both of an N kHz and M kHz codec, where N>M, and where the N codec is the first codec. Additionally, the "indication" can be a message from an application to operating system 300 indicating that the codec is preferentially to be used, can be a signal from a circuit on electronic device 200 indicating that the codec is preferentially to be used, etc.

Then, upon discovering electronic device 202 while performing operations to discover another available device for forming a Bluetooth network connection, electronic device 200 performs operations to configure the Bluetooth network connection (step 402). The operations for discovering another available electronic device and configuring a Bluetooth network connection, aside from the operations herein described, are known in the art and hence are not described in more detail.

As part of the operations for forming a bluetooth network connection, electronic device 200 sends a configuration message to electronic device 202 that indicates that a first codec is preferentially to be used when communicating audio data using the bluetooth network connection (step 404). In the described embodiments, the configuration message sent from electronic device 200 can be any suitable Bluetooth packet (PDU) that can be arranged to indicate that a first codec is preferentially to be used. In some embodiments, the configuration message can also indicate that, if the first codec is not permissible to use (e.g., if electronic device 202 does not support the codec or is otherwise configured not to use the codec), a second codec will be used. For example, the configuration message can include a field with a listing of the first codec (e.g., a 16 kHz codec) that is preferentially to be used, and may also include a field listing a second codec (e.g., the 8 kHz codec) that will be used in the event that the first codec is not permissible use.

In some embodiments, one or both of electronic device 200 and electronic device 202 supports two or more codecs. In these embodiments, when electronic device 200 sends the configuration message to electronic device 202, electronic device can provide a list of supported codecs in preference order. This can function as an indication of the codecs that electronic device 200 preferentially desires to use in order. Electronic device 202 can use the list when generating a response, and can include a list of codecs supported in electronic device 202 in preference order based on the list received from electronic device 200. In this way, the two electronic devices can provide options in terms of the codecs that may be used. In embodiments where multiple codecs at a given sampling rate are supported (e.g., multiple 16 kHz codecs) or where there are several codecs at different sampling rates (e.g., an 8 kHz codec, a 12 kHz codec, a 16 kHz codec, etc.), this can enable the devices to more easily configure the codec to be used.

Electronic device 200 then receives a response from electronic device 202 and determines if the received response indicates that the first codec is permissible to use when communicating audio data between electronic device 200 and electronic device 202 using the Bluetooth network connection (step 406). In the described embodiments, the response received from electronic device 202 can be any suitable Bluetooth packet (PDU) that can be arranged to indicate that a first codec is (or is not) permissible to use.

When the received response indicates that the first codec is permissible to use, electronic device 200 configures itself to use the first codec when communicating audio data (step 408). Otherwise, when the received response indicates that the first codec is not permissible to use, electronic device 200 configures itself to use the second (perhaps default) codec when communicating audio data (step 410). In the described embodiments, when configuring itself to use a given codec when communicating audio data, electronic device 200 configures one or more circuits, applications, etc. in electronic device 200 to use the given codec for performing audio processing operations such as speech encoding/decoding, etc.

In the described embodiments, after providing the response indicating that the first codec is or is not permissible to use, electronic device 202 configures itself accordingly. Specifically, electronic device 202 configures one or more circuits, applications, etc. in electronic device 202 to use a corresponding codec for performing audio processing operations such as speech encoding/decoding, etc.

In the described embodiments, electronic device 200 can then configure one or more circuits in electronic device 200 to perform an audio processing operation at a predetermined rate so that sufficient audio data is available for filling payloads of data packets to be communicated to the second electronic device using the Bluetooth network connection, without overflowing the payloads of the data packets. More specifically, as described above, because data rates for the Bluetooth network connection can be computed using the size of packets to be communicated on the Bluetooth network connection, and because the codec is known (i.e., has been configured), electronic device can determine an optimal data rate that keeps packets as full as possible with audio data without overflowing the packets, and can configure the circuits in electronic device 200 accordingly.

Figure 5:
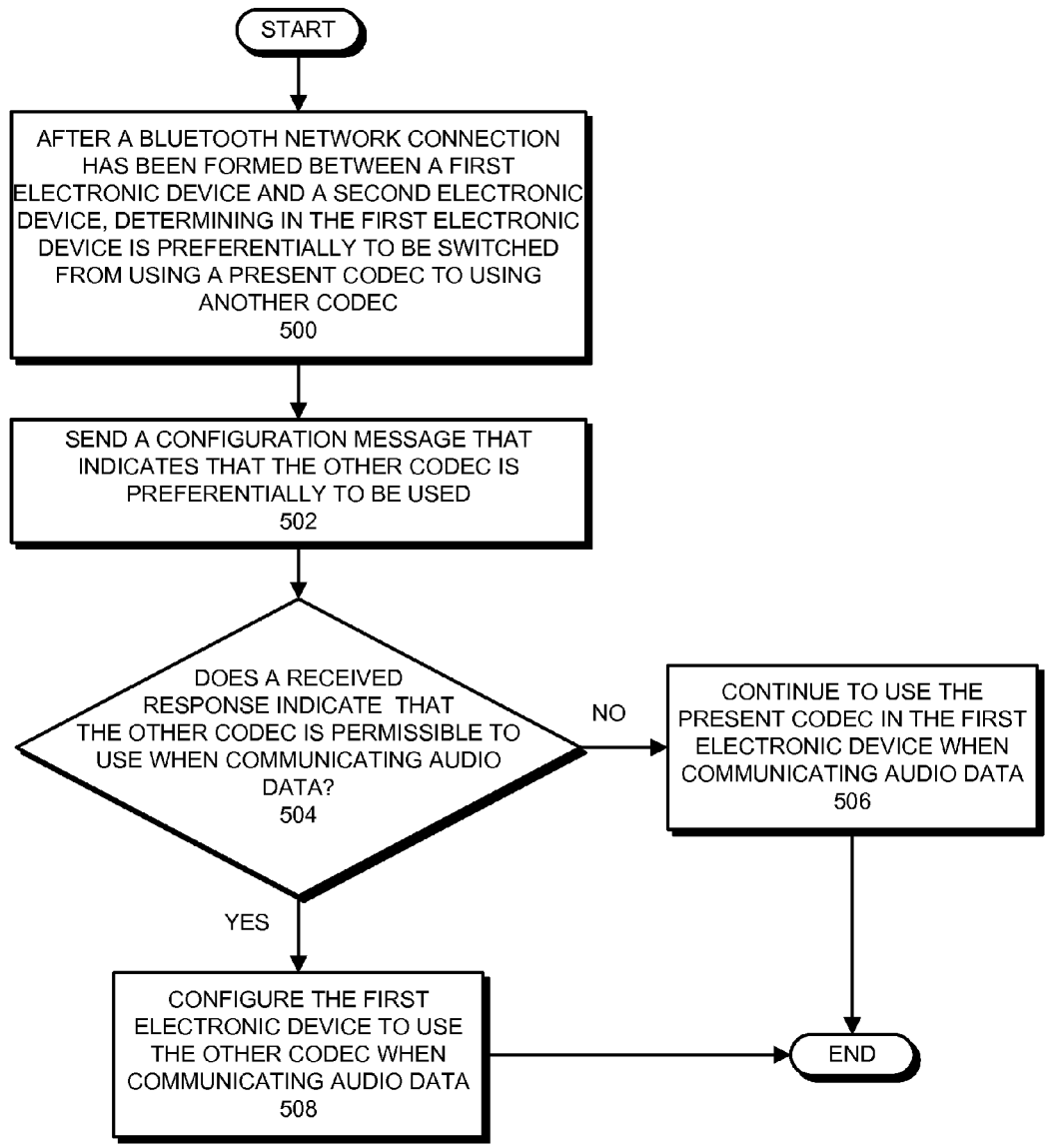
FIG. 5 presents a flowchart illustrating a process for dynamically updating a codec in an electronic device in accordance with the described embodiments.

Although the process in FIG. 4 is described for establishing a Bluetooth network connection between the devices, some embodiments can also dynamically update a codec used for communicating audio data using a Bluetooth network connection. FIG. 5 presents a flowchart illustrating a process for dynamically updating a codec in an electronic device in accordance with the described embodiments. The process shown in FIG. 5 starts after a Bluetooth network connection has been formed between electronic devices 200 and 202 (e.g., as described and shown in FIG. 4). Thus, a codec has already been configured to be used in electronic devices 200 and 202, and audio data may have been exchanged between electronic devices 200 and 202 using the Bluetooth network connection.

As shown in FIG. 5, after a Bluetooth network connection has been formed between electronic device 200 and electronic device 202, electronic device 200 determines that electronic device 200 is preferentially to be switched from using a present codec to using another codec (step 500). This determination can be made based on a message received from an application running on electronic device 200 requesting a switch of the codec, from a signal received from a circuit in electronic device 200, etc. In the described embodiments, the present codec and the other codec can be any codecs supported by electronic device 200, e.g., the present codec can be an 8 kHz codec and the other codec can be a 16 kHz codec, or vise versa (although electronic device 200 may keep a record of non-supported codecs and may not make two requests for a non-supported codec).

Electronic device 200 then sends a configuration message to electronic device 202 that indicates that the other codec is preferentially to be used (step 502). In the described embodiments, the configuration message sent from electronic device 200 can be any suitable Bluetooth packet (PDU) that can be arranged to indicate that a other codec is preferentially to be used.

Electronic device 200 then receives a response from electronic device 202 and determines if the received response indicates that the other codec is permissible to use when communicating audio data (step 504). In the described embodiments, the response sent from electronic device 202 can be any suitable Bluetooth packet (PDU) that can be arranged to indicate that the other codec is (or is not) permissible to use.

When the received response indicates that the other codec is permissible to use, electronic device 200 configures itself to use the other codec when communicating audio data (step 506). Otherwise, when the received response indicates that the first codec is not permissible to use, electronic device 200 continues to use the present codec when communicating audio data (step 508). In the described embodiments, when configuring itself to use a given codec when communicating audio data, electronic device 200 configures one or more circuits, applications, etc. in electronic device 200 to use the given codec for performing audio processing operations such as speech encoding/decoding, etc.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments.

What is claimed is:

1. An electronic device that configures a codec, comprising:
a processing subsystem in the electronic device, wherein the electronic device is a first electronic device, and wherein the processing subsystem performs operations for:
configuring a Bluetooth network connection between the first electronic device and a second electronic device, wherein configuring the Bluetooth network connection comprises sending a configuration message to the second electronic device that indicates that a first codec is preferentially to be used when communicating audio data using the Bluetooth network connection, wherein the configuration message comprises a listing of each codec supported by the first electronic device in a first order of preference;
receiving a response from the second electronic device that indicates that the first codec is not permissible to use when communicating audio data using the Bluetooth network connection, wherein the response comprises a listing of each codec supported by the second electronic device in a second order of preference, wherein the second order of preference is based on the first order of preference; and
configuring the first electronic device to use a second codec when communicating audio data using the Bluetooth network connection, wherein the configuring comprises determining a codec that is permissible to use based on the second order of preference.

2. The electronic device of claim 1, wherein the processing subsystem performs operations for:
receiving an indication that a Bluetooth network connection is to be formed between the first electronic device and another available electronic device, wherein the indication includes a request to preferentially use the first codec for communicating audio data using the Bluetooth network connection; and
performing a discovery process to discover other devices with which a Bluetooth network connection can be formed.

3. The electronic device of claim 1, wherein the first codec is a M kHz codec and the second codec is an N kHz codec, where M and N represent numbers and M>N.

4. The electronic device of claim 1, wherein, when subsequently using the Bluetooth network connection to communicate audio data from the first electronic device to the second electronic device, the processing subsystem performs operations for:
configuring one or more circuits in the first electronic device to perform an audio processing operation at a predetermined rate so that sufficient audio data is available for filling payloads of data packets to be communicated to the second electronic device using the Bluetooth network connection without overflowing the payloads of the data packets, wherein the predetermined rate is chosen in accordance with the codec being used.

5. The electronic device of claim 1, wherein, after the Bluetooth network connection has been formed between the first electronic device to the second electronic device, the processing subsystem performs operations for:
determining that the first electronic device is preferentially to be switched from using a present codec to using another codec;
sending a configuration message to the second electronic device that indicates that the other codec is preferentially to be used;
upon receiving a response from the second electronic device that indicates that using the other codec is permissible, configuring the first electronic device to use the other codec when using the Bluetooth network connection to communicate audio data from the first electronic device to the second electronic device; and
upon receiving a response from the second electronic device that indicates that using the other codec is not permissible, continuing to use the present codec when using the Bluetooth network connection to communicate audio data from the first electronic device to the second electronic device.

6. The electronic device of claim 1, wherein sending the configuration message comprises including an indication in the configuration message that the second codec is to be used in the event that it is not permissible to use the first codec.

7. The electronic device of claim 1, wherein the second codec is a default codec.

8. The electronic device of claim 1, wherein the processing system performs operations for, upon receiving a response from the second electronic device that indicates that the first codec is permissible to use when communicating audio data using the Bluetooth network connection, configuring the first electronic device to use the first codec when communicating audio data using the Bluetooth network connection.

9. A method for configuring a codec for an electronic device, comprising:
in a first electronic device, performing operations for:
configuring a Bluetooth network connection between the first electronic device and a second electronic device, wherein configuring the Bluetooth network connection comprises sending a configuration message to the second electronic device that indicates that a first codec is preferentially to be used when communicating audio data using the Bluetooth network connection, wherein the configuration message comprises a listing of each codec supported by the first electronic device in a first order of preference;

receiving a response from the second electronic device that indicates that the first codec is not permissible to use when communicating audio data using the Bluetooth network connection, wherein the response comprises a listing of each codec supported by the second electronic device in a second order of preference, wherein the second order of preference is based on the first order of preference; and configuring the first electronic device to use a second codec when communicating audio data using the Bluetooth network connection, wherein the configuring comprises determining a codec that is permissible to use based on the second order of preference.

10. The method of claim 9, wherein the method further comprises:

receiving an indication that a Bluetooth network connection is to be formed between the first electronic device and another available electronic device, wherein the indication includes a request to preferentially use the first codec for communicating audio data using the Bluetooth network connection; and performing a discovery process to discover other devices with which a Bluetooth network connection can be formed.

11. The method of claim 9, wherein the first codec is a M kHz codec and the second codec is an N kHz codec, where M and N represent numbers and M>N.

12. The method of claim 9, wherein subsequently using the Bluetooth network connection to communicate audio data from the first electronic device to the second electronic device comprises:

configuring one or more circuits in the first electronic device to perform an audio processing operation at a predetermined rate so that sufficient audio data is available for filling payloads of data packets to be communicated to the second electronic device using the Bluetooth network connection without overflowing the payloads of the data packets, wherein the predetermined rate is chosen in accordance with the codec being used.

13. The method of claim 9, wherein the method further comprises:

after the Bluetooth network connection has been formed between the first electronic device to the second electronic device, determining that the first electronic device is preferentially to be switched from using a present codec to using another codec;

sending a configuration message to the second electronic device that indicates that the other codec is preferentially to be used;

upon receiving a response from the second electronic device that indicates that using the other codec is permissible, configuring the first electronic device to use the other codec when using the Bluetooth network connection to communicate audio data from the first electronic device to the second electronic device; and upon receiving a response from the second electronic device that indicates that using the other codec is not permissible, continuing to use the present codec when using the Bluetooth network connection to communicate audio data from the first electronic device to the second electronic device.

14. The method of claim 9, wherein sending the configuration message comprises including an indication in the configuration message that the second codec is to be used in the event that it is not permissible to use the first codec.

15. The method of claim 9, wherein the second codec is a default codec.

16. The method of claim 9, wherein the first electronic device further performs operations for:

upon receiving a response from the second electronic device that indicates that the first codec is permissible to use when communicating audio data using the Bluetooth network connection, configuring the first electronic device to use the first codec when communicating audio data using the Bluetooth network connection.

17. A non-transitory computer-readable storage medium storing instructions that, when executed by an electronic device with computing capabilities, cause the electronic device to perform a method for configuring a codec for an electronic device, the method comprising:

in a first electronic device, configuring a Bluetooth network connection between the first electronic device and a second electronic device, wherein configuring the Bluetooth network connection comprises sending a configuration message to the second electronic device that indicates that a first codec is preferentially to be used when communicating audio data using the Bluetooth network connection, wherein the configuration message comprises a listing of each codec supported by the first electronic device in a first order of preference;

receiving a response from the second electronic device that indicates that the first codec is not permissible to use when communicating audio data using the Bluetooth network connection, wherein the response comprises a listing of each codec supported by the second electronic device in a second order of preference, wherein the second order of preference is based on the first order of preference; and configuring the first electronic device to use a second codec when communicating audio data using the Bluetooth network connection, wherein the configuring comprises determining a codec that is permissible to use based on the second order of preference.

18. The computer-readable storage medium of claim 17, wherein the method further comprises:

receiving an indication that a Bluetooth network connection is to be formed between the first electronic device and another available electronic device, wherein the indication includes a request to preferentially use the first codec for communicating audio data using the Bluetooth network connection; and performing a discovery process to discover other devices with which a Bluetooth network connection can be formed.

19. The computer-readable storage medium of claim 17, wherein the first codec is a M kHz codec and the second codec is an N kHz codec, where M and N represent numbers and M>N.

20. The computer-readable storage medium of claim 17, wherein subsequently using the Bluetooth network connection to communicate audio data from the first electronic device to the second electronic device comprises:

configuring one or more circuits in the first electronic device to perform an audio processing operation at a predetermined rate so that sufficient audio data is available for filling payloads of data packets to be communicated to the second electronic device using the Bluetooth network connection without overflowing the payloads of the data packets, wherein the predetermined rate is chosen in accordance with the codec being used.

21. The computer-readable storage medium of claim 17, wherein the method further comprises:

after the Bluetooth network connection has been formed between the first electronic device to the second electronic device, determining that the first electronic device is preferentially to be switched from using a present codec to using another codec;

sending a configuration message to the second electronic device that indicates that the other codec is preferentially to be used;

upon receiving a response from the second electronic device that indicates that using the other codec is permissible, configuring the first electronic device to use the other codec when using the Bluetooth network connection to communicate audio data from the first electronic device to the second electronic device; and upon receiving a response from the second electronic device that indicates that using the other codec is not permissible, continuing to use the present codec when using the Bluetooth network connection to communicate audio data from the first electronic device to the second electronic device.

22. The computer-readable storage medium of claim 17, wherein sending the configuration message comprises including an indication in the configuration message that the second codec is to be used in the event that it is not permissible to use the first codec.

23. The computer-readable storage medium of claim 17, wherein the second codec is a default codec.

24. The computer-readable storage medium of claim 17, wherein the method further comprises:

upon receiving a response from the second electronic device that indicates that the first codec is permissible to use when communicating audio data using the Bluetooth network connection, configuring the first electronic device to use the first codec when communicating audio data using the Bluetooth network connection.

25. An electronic device that configures a codec, comprising:

a processing subsystem in the electronic device, wherein the electronic device is a first electronic device, and wherein the processing subsystem performs operations for:

configuring a Bluetooth network connection between the first electronic device and a second electronic device, wherein configuring the Bluetooth network connection comprises sending a configuration message to the second electronic device that indicates that a first codec is preferentially to be used when communicating audio data using the Bluetooth network connection;

upon receiving a response from the second electronic device that indicates that the first codec is not permissible to use when communicating audio data using the Bluetooth network connection, configuring the first electronic device to use a second codec when communicating audio data using the Bluetooth network connection; and after the Bluetooth network connection has been formed between the first electronic device and the second electronic device:

determining that the first electronic device is preferentially to be switched from using a present codec to using an other codec;

sending a configuration message to the second electronic device that indicates that the other codec is preferentially to be used;

upon receiving a response from the second electronic device that indicates that using the other codec is permissible, configuring the first electronic device to use the other codec when using the Bluetooth network connection to communicate audio data from the first electronic device to the second electronic device; and upon receiving a response from the second electronic device that indicates that using the other codec is not permissible, continuing to use the present codec when using the Bluetooth network connection to communicate audio data from the first electronic device to the second electronic device.

* * * * *